UNITED STATES PATENT OFFICE.

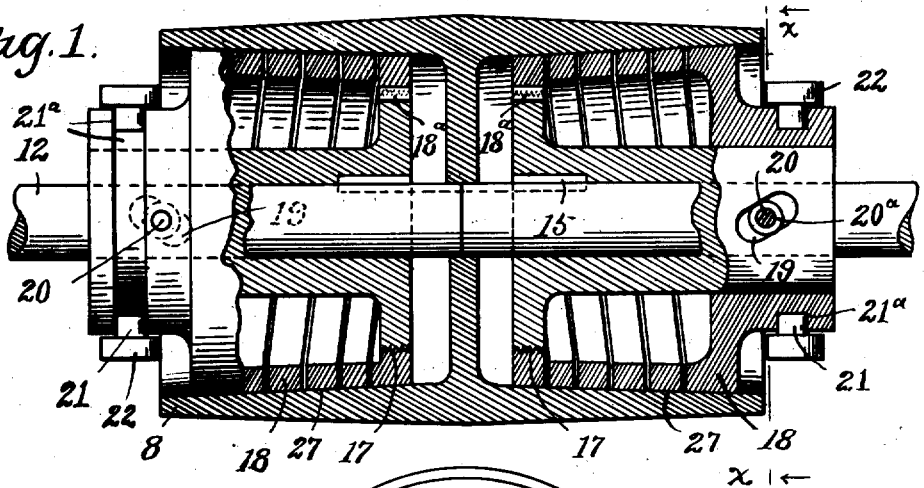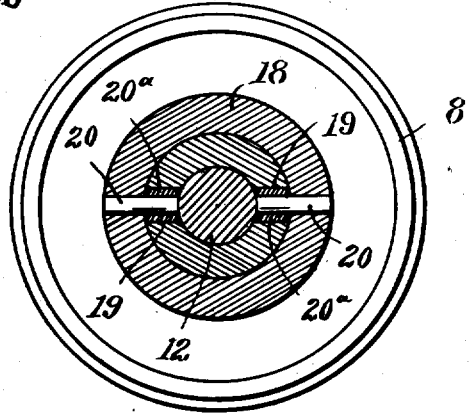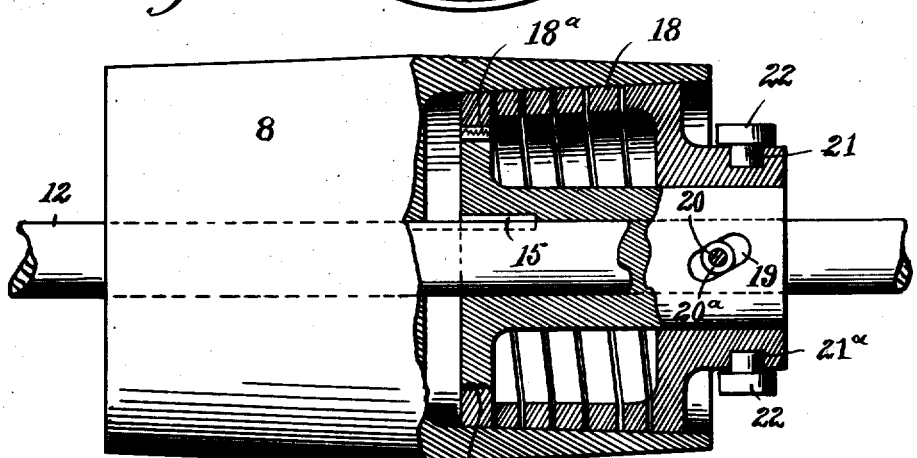

WALTER VAN PATTEN STEIGER, OF BRIDGEPORT, CONNECTICUT.

FRICTION-CLUTCH.

1,013,848. Specification of Letters Patent. Patented Jan. 2, 1912.

Application filed September 3, 1909. Serial No. 516,042.

*To all whom it may concern:*

Be it known that I, WALTER VAN PATTEN STEIGER, a citizen of the United States, and resident of Bridgeport, in the county of Fairfield and State of Connecticut, have invented certain new and useful Improvements in Friction-Clutches, of which the following is a specification.

This invention relates to clutches, and is for the purpose of providing means whereby a driving wheel may be positively connected with a driven shaft, upon which it may be mounted, or, may be freed and allowed to run thereon, and it belongs to that class of clutches, wherein friction is relied upon to connect two moving parts, and may be adapted as a driving medium for various forms of mechanisms and my invention consists particularly in a novel form of mechanism as interposed between the driving and the driven element and the means for rendering same operative.

It will be readily understood that the function of these two parts may be reversed, that is to say, the shaft may be the driving and the pulley the driven element.

Similar characters of reference denote like or corresponding parts throughout the several figures of the accompanying drawings and of which, Figure 1, shows a central vertical longitudinal section through a double form of my improved clutch as applied intermediate of a pulley and pair of shafts. Fig. 2, shows a transverse cross sectional view of the clutch taken on line $x$—$x$ of Fig. 1. Fig. 3, is a similar view of a single form of clutch applied intermediate a pulley and single shaft.

Referring in detail to the drawings 12—12 represents separate shafts or spindles, upon the inner adjacent ends of which is mounted a belt pulley 8 which is designed to run idly upon the said spindles at such times as when the clutches are disengaged. The pulley shown in Fig. 1 is provided with two of my improved clutches, one on each side, and similarly located intermediate of the said pulley and the inner end portions of the said spindles, the one spindle being driven through one of the clutches and the other spindle being driven through the other clutch. These operations may obviously be accomplished at the same time or alternately as the occasion may require. The two clutches are alike in construction except that one is a right and the other is a left and each is provided with means for throwing it into working position. I will describe in detail but one of these clutch elements, as follows: Referring to both Figs. 1 and 2, it will be noted that upon the inner end portions of the spindle 12 is secured, as by means of a key 15, an inner hub 16 that is threaded as at 17 for the attachment of the end portion of the spirally slotted clutch member 18 and pinned at 18ª, thus forming a rigid connection at this point. The reduced outer end of the hub is provided with two spiral slots 19 with a lead in the same direction as the spiral or the clutch element, and these slots 19 are engaged by pins 20 secured to the reduced outer end of clutching sleeve 18 and these pins are provided with anti-friction rolls 20ª to insure their free operation in slots. The reduced or hub portion of this clutching sleeve is provided with an annular groove 21 for the engagement of inwardly disposed pins 21 of a common form of yoke 22 pivoted in any suitable way and adapted to be thrown back and forth for the manipulation of the clutch. From the foregoing it will be seen that with each throw of the yoke the outer end of said clutch element is shoved in or out with relation to the hub and inner end of said clutch element and by reason of the pin connections with the slots 19 of the hub the outer end of the clutch element is also given a slight rotary movement. As the outer end of the clutch element is shoved in as above it is expanded by reason of its axial compression and by the angular movement due to the engagement of pins 20 and rolls 20ª with slots 19 thereby engaging the clutch surface 27 of the pulley. A movement of the yoke in the opposite direction draws the hub of the clutching member out, thereby releasing the clutch by reason of a reversal of above movements, thereby disconnecting the same from the spindle. It will be readily seen that the tangental load on the clutch element when the same is engaged will be transmitted to slots 19 causing the outer end of the clutch element to revolve in relation to the inner end of said clutch element thereby causing an increased expansion of said element and obviously an increase in radial pressure.

In the construction shown in Fig. 3, I have shown a single clutch interposed between a shaft and pulley and in this case the shaft 12 extends through both the pulley and the clutch and the pulley is designed to run free upon the shaft except for the clutch mechanism interposed therebetween, otherwise the construction is substantially the same as that shown in figures.

Having thus described my invention what I claim as new and desire to secure by Letters Patent is:—

1. The combination with a driving element having an internal clutch surface and a driven element of an interposed clutch element, consisting of a spirally slotted sleeve positively attached at one end to the driven element and slidingly attached at the other end to the same element by a pin and slot connection and provided with means for compressing the sleeve axially with relation to its fixed end.

2. In a clutch of the class described, the combination with a shaft, of a wheel mounted thereon and having an internal clutch surface, a hub fixed upon said shaft, a spirally slotted clutch member secured to one end of said hub and slidably mounted upon the other end and adapted to be compressed axially thereon and thereby expanded to engage the wheel surface, a yoke to engage said clutch member, and a lever for operating the yoke and clutch.

3. In a clutch of the class described, the combination with a shaft, of a wheel mounted thereon and having an internal clutch surface, a hub mounted upon said and having a slot therein, a spirally slotted clutch member upon the hub and having one end secured thereto and the other end slidably connected to said hub and bearing a pin for the engagement of the said slot, and means for compressing the slotted clutch member lengthwise for expanding the same to engage the inner face of the wheel.

Signed at Bridgeport in the county of Fairfield and State of Connecticut this 2nd day of September A. D., 1909.

WALTER VAN PATTEN STEIGER.

Witnesses:
 ELBERT O. HULL,
 MILDRED MACLEOD.

---

Correction in Letters Patent No. 1,013,848.

It is hereby certified that in Letters Patent No. 1,013,848, granted January 2, 1912, upon the application of Walter Van Patten Steiger, of Bridgeport, Connecticut, for an improvement in "Friction-Clutches," an error appears in the printed specification requiring correction as follows: Page 2, line 34, strike out the words "mounted upon said" and insert the words *fixed to the said shaft;* and that the said Letters Patent should be read with this correction therein that the same may conform to the record of the case in the Patent Office.

Signed and sealed this 13th day of February, A. D., 1912.

[SEAL.]

C. C. BILLINGS,
*Acting Commissioner of Patents.* the shaft 12 extends through both the pulley and the clutch and the pulley is designed to run free upon the shaft except for the clutch mechanism interposed therebetween, otherwise the construction is substantially the same as that shown in figures.

Having thus described my invention what I claim as new and desire to secure by Letters Patent is:—

1. The combination with a driving element having an internal clutch surface and a driven element of an interposed clutch element, consisting of a spirally slotted sleeve positively attached at one end to the driven element and slidingly attached at the other end to the same element by a pin and slot connection and provided with means for compressing the sleeve axially with relation to its fixed end.

2. In a clutch of the class described, the combination with a shaft, of a wheel mounted thereon and having an internal clutch surface, a hub fixed upon said shaft, a spirally slotted clutch member secured to one end of said hub and slidably mounted upon the other end and adapted to be compressed axially thereon and thereby expanded to engage the wheel surface, a yoke to engage said clutch member, and a lever for operating the yoke and clutch.

3. In a clutch of the class described, the combination with a shaft, of a wheel mounted thereon and having an internal clutch surface, a hub mounted upon said and having a slot therein, a spirally slotted clutch member upon the hub and having one end secured thereto and the other end slidably connected to said hub and bearing a pin for the engagement of the said slot, and means for compressing the slotted clutch member lengthwise for expanding the same to engage the inner face of the wheel.

Signed at Bridgeport in the county of Fairfield and State of Connecticut this 2nd day of September A. D., 1909.

WALTER VAN PATTEN STEIGER.

Witnesses:
ELBERT O. HULL,
MILDRED MACLEOD.

---

Correction in Letters Patent No. 1,013,848.

It is hereby certified that in Letters Patent No. 1,013,848, granted January 2, 1912, upon the application of Walter Van Patten Steiger, of Bridgeport, Connecticut, for an improvement in "Friction-Clutches," an error appears in the printed specification requiring correction as follows: Page 2, line 34, strike out the words "mounted upon said" and insert the words *fixed to the said shaft;* and that the said Letters Patent should be read with this correction therein that the same may conform to the record of the case in the Patent Office.

Signed and sealed this 13th day of February, A. D., 1912.

[SEAL.]

C. C. BILLINGS,
*Acting Commissioner of Patents.*

Correction in Letters Patent No. 1,013,848.

It is hereby certified that in Letters Patent No. 1,013,848, granted January 2, 1912, upon the application of Walter Van Patten Steiger, of Bridgeport, Connecticut, for an improvement in "Friction-Clutches," an error appears in the printed specification requiring correction as follows: Page 2, line 34, strike out the words "mounted upon said" and insert the words *fixed to the said shaft;* and that the said Letters Patent should be read with this correction therein that the same may conform to the record of the case in the Patent Office.

Signed and sealed this 13th day of February, A. D., 1912.

[SEAL.]

C. C. BILLINGS,
*Acting Commissioner of Patents.*